US007627764B2

(12) United States Patent
Koshy et al.

(10) Patent No.: US 7,627,764 B2
(45) Date of Patent: Dec. 1, 2009

(54) APPARATUS AND METHOD FOR PERFORMING MD5 DIGESTING

(75) Inventors: Kamal J. Koshy, Milpitas, CA (US); Jaroslaw J. Sydir, San Jose, CA (US); Wajdi K. Feghali, Boston, MA (US)

(73) Assignee: Intel Corporation, Santa Clara, CA (US)

( * ) Notice: Subject to any disclaimer, the term of this patent is extended or adjusted under 35 U.S.C. 154(b) by 831 days.

(21) Appl. No.: 10/877,464

(22) Filed: Jun. 25, 2004

(65) Prior Publication Data

US 2006/0010327 A1    Jan. 12, 2006

(51) Int. Cl.
*H04L 9/00* (2006.01)
(52) U.S. Cl. .................. 713/181; 713/161; 713/168; 713/175; 713/189; 380/251; 380/259; 380/260; 380/29; 709/206; 709/225
(58) Field of Classification Search .................. 713/181
See application file for complete search history.

(56) References Cited

U.S. PATENT DOCUMENTS

| | | | | |
|---|---|---|---|---|
| 5,970,143 | A * | 10/1999 | Schneier et al. | 713/181 |
| 6,021,201 | A * | 2/2000 | Bakhle et al. | 713/189 |
| 6,091,821 | A | 7/2000 | Buer | |
| 6,356,936 | B1 * | 3/2002 | Donoho et al. | 709/206 |
| 6,360,320 | B1 * | 3/2002 | Ishiguro et al. | 713/164 |
| 6,816,968 | B1 * | 11/2004 | Walmsley | 713/168 |
| 6,820,081 | B1 * | 11/2004 | Kawai et al. | 707/7 |
| 6,832,316 | B1 * | 12/2004 | Sibert | 713/181 |
| 7,286,664 | B1 * | 10/2007 | Stolov | 380/28 |
| 2002/0046339 | A1 * | 4/2002 | Bellare et al. | 713/170 |
| 2002/0191791 | A1 | 12/2002 | Anand | |
| 2003/0191943 | A1 * | 10/2003 | Poisner et al. | 713/181 |
| 2004/0078576 | A1 * | 4/2004 | Geitinger | 713/181 |
| 2004/0103286 | A1 * | 5/2004 | Geiringer et al. | 713/181 |
| 2004/0123102 | A1 * | 6/2004 | Gehrmann et al. | 713/161 |

OTHER PUBLICATIONS

Applied Cryptography, Second Edition Protocols, Algorithims, and Source Code in C 1996 by Bruce Schneier.*
Applied Cryptography second edition, 1996.*
J. Deepakumara et al., "FPGA Implementation of MD5 Hash Algorithm", Canadian Conf. on Electrical & Computer Engineering, May 13-16, 2001, IEEE vol. 2, May 2001, pp. 919-924.
PCT Search Report dated Jan. 11, 2007.
Office Action received for European Patent Application No. 05759773.4-2415 mailed on Mar. 11, 2009, 3 pages.
Office Action Received for Chinese Patent Application No. 200510098043.9 mailed on May 22, 2009, 16 pages.
Office Action Received for European Patent Application No. 05759773.4-2415 mailed on Jun. 6, 2007, 4 pages.

(Continued)

*Primary Examiner*—Kambiz Zand
*Assistant Examiner*—Yonas Bayou
(74) *Attorney, Agent, or Firm*—Grossman, Tucker, Perreault & Pfleger, PLLC (57) ABSTRACT

An arrangement is provided for performing MD5 digesting. The arrangement includes apparatuses and methods that pipeline the MD5 digesting process to produce a 128 bit digest for an input message of any arbitrary length.

45 Claims, 9 Drawing Sheets

OTHER PUBLICATIONS

R. Rivest, "MD5 Algorithm," Network Working Group, Request for Comments: 1321, Apr. 1992, pp. 1-39, MIT Laboratory for Computer Science & RSA Data Security, Inc., Retreived from WWW on Jun. 23, 2004 at.

Deepakumara, Janaka, et al., "FPGA Implementation of MD5 Hash Algorithm," Electrical and Computer Engineering, 2001, vol. 2, May 13, 2001.

PCT ISR/WRO, PCT/US2005/020501, Oct. 7, 2005.

* cited by examiner

FIGURE 1

```
/* Process each 16-word block. */
1:  For i = 0 to N/16-1 do

/* Copy block i into X. */
2:      For k = 0 to 15 do
3:          Set X[k] to M[i*16+k];
4:      end /* of loop on k */

/* Save A as AA, B as BB, C as CC, and D as DD. */
5:      AA = A; BB = B; CC = C; DD = D;

/* Round 1. */
        /* Let [abcd k s m] denote the operation a = b + ((a + F(b,c,d) + X[k] + T[m]) <<< s). */
        /* Do the following 16 operations. */
6:      [ABCD 0 7 1];      [DABC 1 12 2];     [CDAB 2 17 3];     [BCDA 3 22 4];
7:      [ABCD 4 7 5];      [DABC 5 12 6];     [CDAB 6 17 7];     [BCDA 7 22 8];
8:      [ABCD 8 7 9];      [DABC 9 12 10];    [CDAB 10 17 11];   [BCDA 11 22 12];
9:      [ABCD 12 7 13];    [DABC 13 12 14];   [CDAB 14 17 15];   [BCDA 15 22 16];

/* Round 2. */
        /* Let [abcd k s m] denote the operation a = b + ((a + G(b,c,d) + X[k] + T[m]) <<< s). */
        /* Do the following 16 operations. */
10:     [ABCD 1 5 17];     [DABC 6 9 18];     [CDAB 11 14 19];   [BCDA 0 20 20];
11:     [ABCD 5 5 21];     [DABC 10 9 22];    [CDAB 15 14 23];   [BCDA 4 20 24];
12:     [ABCD 9 5 25];     [DABC 14 9 26];    [CDAB 3 14 27];    [BCDA 8 20 28];
13:     [ABCD 13 5 29];    [DABC 2 9 30];     [CDAB 7 14 31];    [BCDA 12 20 32];

/* Round 3. */
        /* Let [abcd k s m] denote the operation a = b + ((a + H(b,c,d) + X[k] + T[m]) <<< s). */
        /* Do the following 16 operations. */
14:     [ABCD 5 4 33];     [DABC 8 11 34];    [CDAB 11 16 35];   [BCDA 14 23 36];
15:     [ABCD 1 4 37];     [DABC 4 11 38];    [CDAB 7 16 39];    [BCDA 10 23 40];
16:     [ABCD 13 4 41];    [DABC 0 11 42];    [CDAB 3 16 43];    [BCDA 6 23 44];
17:     [ABCD 9 4 45];     [DABC 12 11 46];   [CDAB 15 16 47];   [BCDA 2 23 48];

/* Round 4. */
        /* Let [abcd k s m] denote the operation a = b + ((a + I(b,c,d) + X[k] + T[m]) <<< s). */
        /* Do the following 16 operations. */
18:     [ABCD 0 6 49];     [DABC 7 10 50];    [CDAB 14 15 51];   [BCDA 5 21 52];
19:     [ABCD 12 6 53];    [DABC 3 10 54];    [CDAB 10 15 55];   [BCDA 1 21 56];
20:     [ABCD 8 6 57];     [DABC 15 10 58];   [CDAB 6 15 59];    [BCDA 13 21 60];
21:     [ABCD 4 6 61];     [DABC 11 10 62];   [CDAB 2 15 63];    [BCDA 9 21 64];

/* Then perform the following additions. (That is increment each of the four registers
           by the value it had before this block was started.) */
22:     A = A + AA; B = B + BB; C = C + CC; D = D + DD;

23: end /* of loop on i */
```

| CYCLE 1 | CYCLE 2 | CYCLE 3 | CYCLE 4 |
|---|---|---|---|
| ITERATION 1: PERFORM PRE-ADDITION, CALCULATE FUNCTION IN TWO SETS, AND SELECT A RESULT FROM EACH SET | ITERATION 2: PERFORM PRE-ADDITION, CALCULATE FUNCTION IN TWO SETS, AND SELECT A RESULT FROM EACH SET | ITERATION 3: PERFORM PRE-ADDITION, CALCULATE FUNCTION IN TWO SETS, AND SELECT A RESULT FROM EACH SET | ITERATION 4: PERFORM PRE-ADDITION, CALCULATE FUNCTION IN TWO SETS, AND SELECT A RESULT FROM EACH SET |
|  | ITERATION 1: SELECT CORRECT FUNCTION RESULT BIT BY BIT, PERFORM TWO ADDITIONS AND ONE SHIFT | ITERATION 2: SELECT CORRECT FUNCTION RESULT BIT BY BIT, PERFORM TWO ADDITIONS AND ONE SHIFT | ITERATION 3: SELECT CORRECT FUNCTION RESULT BIT BY BIT, PERFORM TWO ADDITIONS AND ONE SHIFT |

APPARATUS AND METHOD FOR
PERFORMING MD5 DIGESTING

BACKGROUND

1. Field

The present invention relates generally to network security and, more specifically, to apparatuses and methods for pipelining the MD5 digesting process.

2. Description

Networks enable computers and other devices to communicate. For example, networks can carry data representing video, audio, e-mail, and so forth. However, network systems are subject to many threats, including loss of privacy, loss of data integrity, identity spoofing, and denial-of-service attacks. To address these threats, many measures have been developed and employed to improve the security of network communications. For example, one measure is to use a message digest algorithm to generate a compact digital signature for an arbitrarily long stream of binary data. An ideal message digest algorithm would never generate the same signature for two different sets of input, but achieving such theoretical perfection would require a message digest as long as the input file. Practical message digest algorithms, such as Message Digest 5 (MD5) algorithm, use a digital signature of modest size (e.g., 128 bits for the MD5 algorithm). It is conjectured that it is computationally infeasible to produce two messages having the same message digest, or to produce any message having a given pre-specified target message digest, using the MD5 digesting process. Therefore, a receiver can use the MD5 digesting process to verify whether data have been altered since the signature was published.

The MD5 processes data in 512 bit blocks and generates a 128 bit digest. When a message spans multiple blocks, a digest generated for one block is used as the initial value of a digest to be generated for the next block. The MD5 digesting process comprises four rounds of computation, with each round including 16 iterations of computation. Although the MD5 digesting process can be implemented through software simulations, a hardware implementation of the digesting process may be more desirable because of the higher processing speed of hardware solutions. It is advantageous when a digesting process does not significantly slow down data processing speed for network communications. In a hardware implementation, a slow speed of MD5 computations may require that more than one MD5 module be used to improve the MD5 processing speed so that the overall data processing speed of a network system will not be slowed down. More MD5 modules require a larger physical area in a chip, and thus higher power consumption and higher costs. Therefore, it is desirable to improve the processing speed of an MD5 hardware implementation.

BRIEF DESCRIPTION OF THE DRAWINGS

The features and advantages of the present invention will become apparent from the following detailed description of the present invention in which:

FIG. 2 shows pseudo code illustrating a process of generating a 128 bit digest for a message;

DETAILED DESCRIPTION

An embodiment of the present invention comprises an apparatus and method for implementing the MD5 digesting process. The MD5 digesting process is a process that produces a 128 bit digest for a message of any arbitrary size. The digesting process comprises four rounds of computations, with each round including 16 iterations of computations. Each iteration of a round involves one function computation, four addition operations, and one shift operation, which may take two clock cycles to complete. Because each iteration uses the result from the preceding iteration, the calculation of successive iterations might not be readily pipelined. Thus, under a straightforward implementation of the MD5 digesting process, it takes at least 128 clock cycles to produce a 128 bit digest for a 512 bit block.

According to an embodiment of the present invention, the calculation of successive iterations for the MD5 digesting process may be pipelined to reduce the number of total cycles needed to produce a 128 bit digest for a 512 bit block. It is a function in each iteration that uses the result from the preceding iteration, and thus prevents the calculation of successive iterations from being pipelined. According to an embodiment of the present invention, two sets of results may be calculated for the function, corresponding to two different assumptions of the result from the preceding iteration. One assumption is that all bits in the result from the preceding iteration are 0's; and the other assumption is that all bits in the result are 1's. Using this approach, the calculation of the function may be started before the result from the preceding iteration becomes available; and when the result is available, the result may be used to select the correct output of the function bit by bit. This approach makes it possible to pipeline the calculation of successive iterations and reduces the number of total clock cycles needed to produce a 128 bit digest for a 512 bit block of a message.

Reference in the specification to "one embodiment" or "an embodiment" of the present invention means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment.

Figure 1:
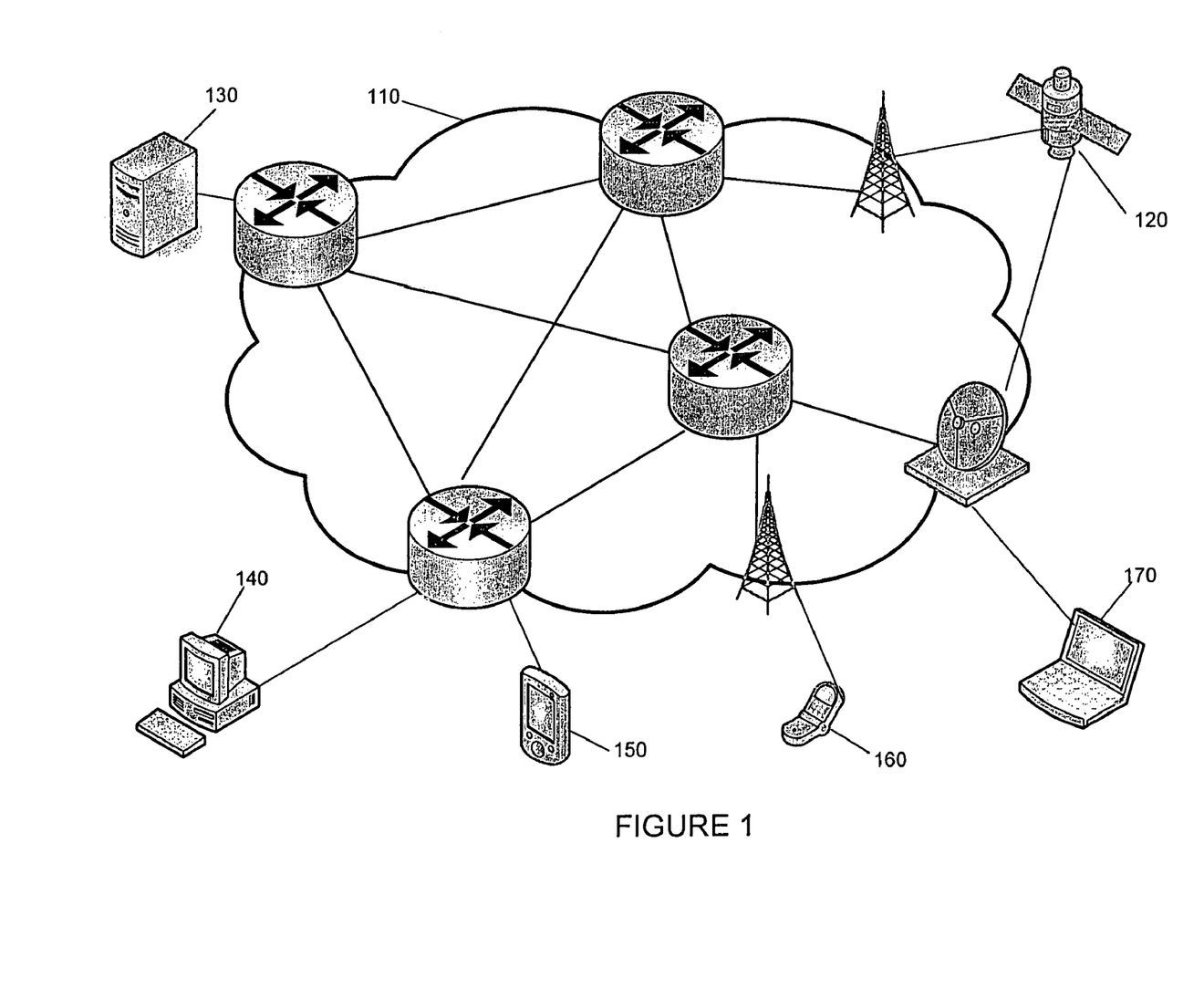
FIG. 1 is a diagram illustrating a general network system.

FIG. 1 depicts a general network system 110 that supports a number of terminals. The network system 110 may comprise a number of devices such as routers, switches, and bridges to facilitate data passage from one terminal to another. The network system may be a wireless system, an Ethernet system, any other systems, or a combination of different network systems. The network system may employ a satellite 120 to help connect one terminal to another terminal. The terminals of the network system may comprise servers (130), desktop computers (140), personal directory assistants (PDAs) (150), cell phones (160), laptop computers (170), or other devices. Data communicated among different terminals may include video, audio, messages, and other data. The network system may use the MD5 digesting process for message verification and authentication to improve the security of network communications.

The MD5 digesting process was designed by Ron Rivest of MIT Laboratory for Computer Science and RSA Data Security, Inc. to produce a 128 bit digest for a message of any arbitrary length. The process is described in "MD5 Algorithm" by Ron Rivest, available at http://www.kleinschmidt.com/edi/md5.htm (last visited Apr. 5, 2004) (hereinafter "MD5 specification"). According to the MD5 specification, a message of any arbitrary length is prepared via padding and appending so that the resulting message, M, has a length that is an exact multiple of 512 bits. In other words, M may be represented by a series of 32-bit words, M[0], M[1], ..., M[N−1], where M□ denotes a word inside message M, and N is a multiple of 16. Four variables, A, B, C, and D, are used throughout the process of generating a message digest and may be stored in a four-word buffer. A final 128 bit digest for the input message is obtained by concatenating bits in A, B, C, and D together. For the convenience of description, these four variables will be called root variables hereinafter. Root variables A, B, C, and D are initialized to the following values in hexadecimal (low-order bytes first):

A: 01 23 45 67,

B: 89 ab cd ef,

C: fe dc ba 98,

D: 76 54 32 10.

Additionally four auxiliary functions, each for a round, are defined and used to compute the message digest:

| | | |
|---|---|---|
| F (B, C, D) = (B AND C) OR ((NOT B) AND D)) | (round 1), | (1) |
| G (B, C, D) = (B AND D) OR (C AND (NOT D)) | (round 2), | (2) |
| H (B, C, D) = B XOR C XOR D | (round 3), | (3) |
| I (B, C, D) = C XOR (B OR (NOT D)) | (round 4). | (4) |

These four functions, F, G, H, and I, act in a "bitwise parallel" manner, to produce their output from the bits of B, C, and D.

FIG. 2 shows pseudo code illustrating the process of generating a 128 bit digest for a message. The pseudo code is adapted from the MD5 specification. An array of variables, T[m], m=1, ..., 64, in the pseudo code represent a number of constant values, where T[m] is equal to the integer part of 4294967296*(abs(sin(m))), where m is measured in radians. In a typical application, values of these constant variables may be pre-calculated and stored in a table (hereinafter "T-table"). Line 1 of the pseudo code starts a loop of processing. The body of the loop, line 2 to line 22, processes a 16-word (512 bit) block of an input message. The loop ends when all 16-word blocks in the input message have been processed. In line 2 to line 4, words in a 16-word block are read into an array of variables, X[k], k=0, ... 15. Line 5 backs up current values of A, B, C, and D using four temporary variables, AA, BB, CC, and DD. Lines 6-9 perform operations involved in round 1, which includes 16 iterations. Each iteration involves operations in the form of:

$$A=B+((A+F(B,C,D)+X[k]+T[m])<<<S), \qquad (5)$$

where "Y<<<S" denotes an operation that left shifts the value of Y by S bits. Lines 10-13 perform operations involved in round 2. Round 2 comprises 16 iterations, each involving operations in the form of:

$$A=B+((A+G(B,C,D)+X[k]+T[m])<<<S). \qquad (6)$$

Lines 14-17 perform operations involved in round 3, which comprises 16 iterations. Each iteration involves operations in the form of:

$$A=B+((A+H(B,C,D)+X[k]+T[m])<<<S). \qquad (7)$$

Finally lines 18-21 perform operations involved in round 4, which comprises 16 iterations. Each iteration involves operations in the form of:

$$A=B+((A+I(B,C,D)+X[k]+T[m])<<<S). \qquad (8)$$

The output data for a 16-word block is obtained, in line 22 after 4 rounds of operations, by summing current values of A, B, C, and D with their previous values obtained for the preceding 16-word block or their initial values if the current 16-word block is the first block in the input message. The process as illustrated in lines 2-22 is repeated until all 16-word blocks in the input message have been processed. The final output for the input message is a 128 bit digest—a concatenation of bits inside A, B, C, and D.

Although iterations in four rounds do not involve the exact same operations, as shown in Equations 5-8, these iterations are very similar. In fact, Equations 5-8 may be summarized as one common form:

$$A=B+((A+FF(B,C,D)+X[k]+T[m,n])<<<S[m,n]), \qquad (9)$$

where FF is a general representation for functions F, G, H, and I; k is an index for words in a 16-word block; m is an index for rounds; and n is an index for iterations in a round. It is also observed that values of the four root variables A, B, C, and D are circularly-rotated to the right by one position from one iteration to another within each round, e.g., ABCD→DABC→CDAB→BCDA→ABCD→DABC→.... Because of the commonality of operations among all iterations and because of the regularity of the root variable rotation from one iteration to another, a common process may be used to perform operations involved in each iteration.

Figure 3:
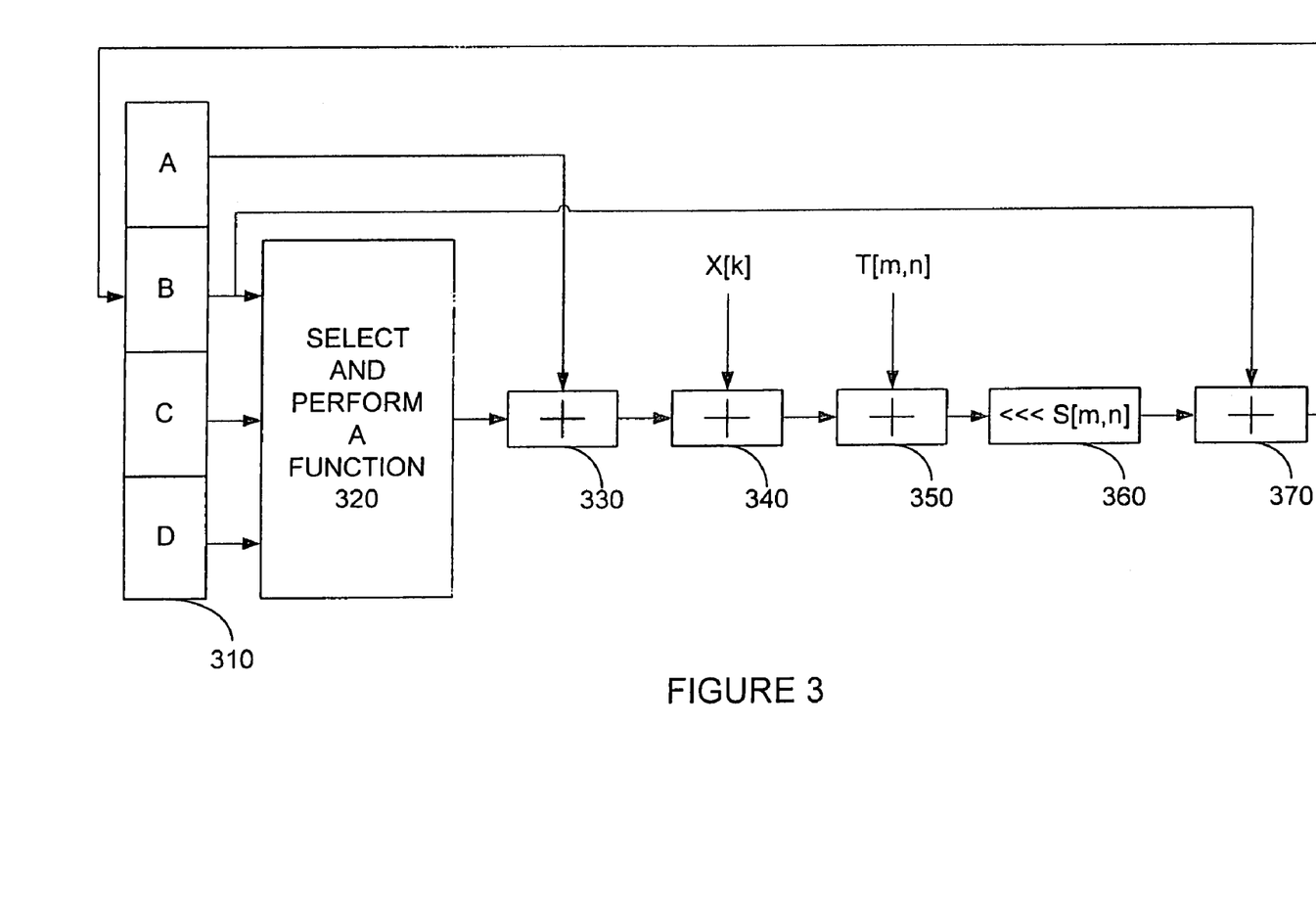
FIG. 3 is a block diagram illustrating an example process of performing operations involved in the MD5 digesting process.

FIG. 3 shows a block diagram illustrating one example process of performing operations involved in each iteration of each round of the MD5 digesting process. In block 310, values of root variables A, B, C, and D may be received. For the first iteration of round 1, the values received for A, B, C, D, are initial values. For all other iterations, the values received are values from the preceding iteration. Also in block 310, values of variables A, B, C, and D are rotated in such a way as "B→C→D→A" after an iteration is completed and before the next iteration is started. In block 320, an auxiliary function (F, G, H, and I for round 1, 2, 3 and 4, respectively) may be selected and performed. In block 330, the output result from the auxiliary function may be added with the value of root variable A. In block 340, the output data from block 330 may be added with X[k], a word selected from 16 words in the 16-word block, which is currently being processed. In block 350, the output data from block 340 may be further added with T[m,n], a constant value selected from the T-table for the n-th iteration of the m-th round. In block 360, the output data from block 350 may be shifted to the left by S[m,n] bits, where S[m,n] is a variable with a predetermined value for the n-th iteration of the m-th round. In block 370, the output data from block 360 may be added with the value of root variable B. An iteration of a round is completed after operations in block 370 are performed. The output data from block 370 may be used to update the root variable A. Because values of variables A, B, C, D are circularly-rotated ("A→B→C→D→A") after an iteration is completed, the value of B may be directly set as the output data from block 370 so that a rotation—B→C→D→A—is actually performed after each iteration.

Figure 4:
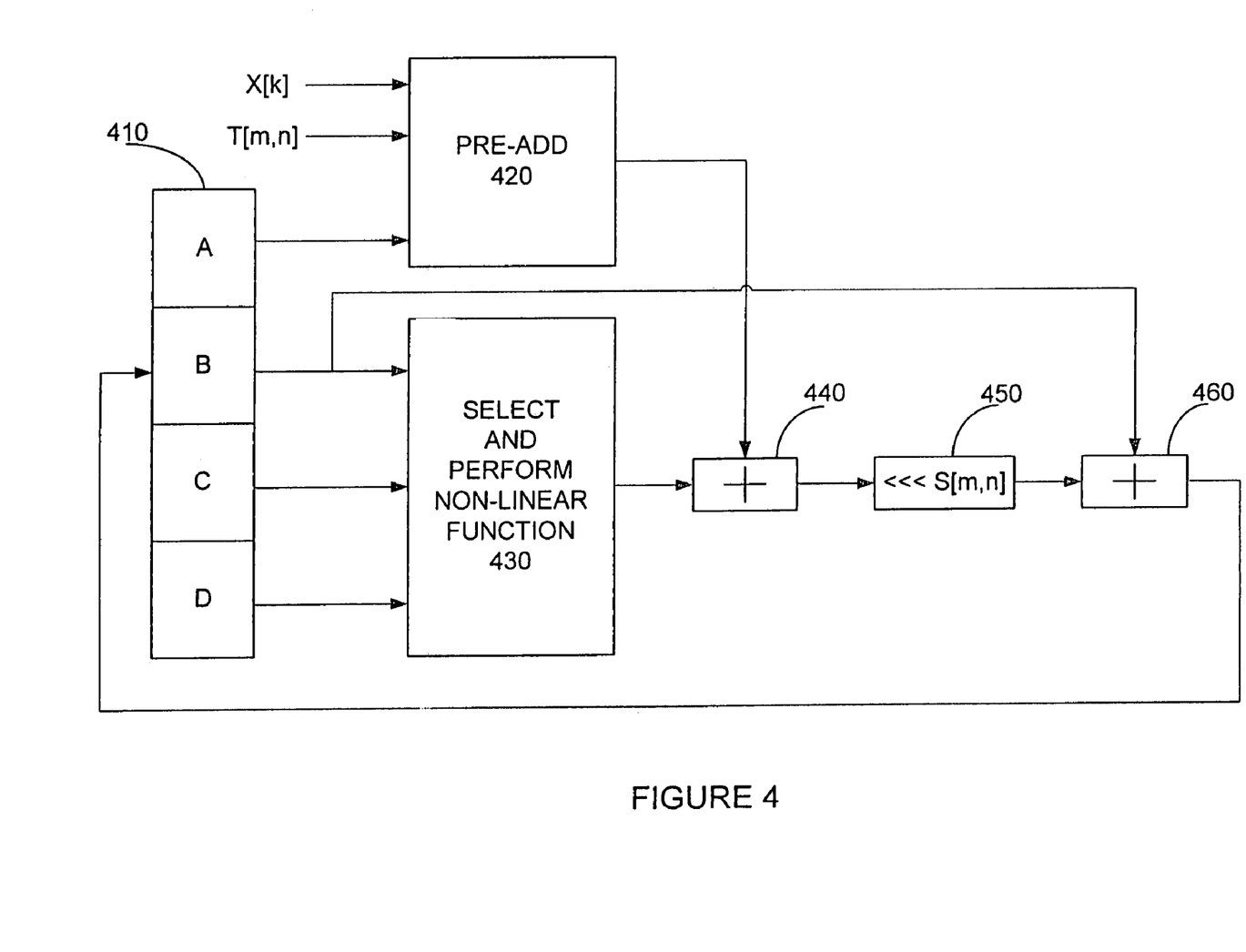
FIG. 4 is a block diagram illustrating another example process of performing operations involved in the MD5 digesting process.

FIG. 4 shows a block diagram illustrating another example process of performing operations involved in each iteration of each round of the MD5 digesting process. In block 410, values of root variables A, B, C, and D may be received. For the first iteration of round 1, the values received for A, B, C, D, are initial values. For all other iterations, the values received are values from the preceding iteration. Also in block 410, values of variables A, B, C, and D are rotated in such a way as "B→C→D→A" after an iteration is completed and before the next iteration is started. It is observed that values of X[k], T[m,n], and root variable A, as shown in FIG. 3, are available before an iteration is started. Thus, X[k], T[m,n], and S[m,n] may be added together in block 420 while an auxiliary function is selected and performed in block 430. In block 440, the output data from block 430 may be added with the output data from block 420. In block 450, the output data from block 440 may be shifted to the left by S[m,n] bits. In block 460, the output data from block 450 may be further added with the value of root variable B. The output data from block 460 may be used to update the value of A. Because of circular rotation among root variables ("A→B→C→D→A"), the value of B may be directly set to the value of the output data from block 460. Since X[k], T[m,n], and the value of A are added together while an auxiliary function is selected and performed, there are one auxiliary function, two additions, and one shift on the critical path of an iteration. Compared to the process shown in FIG. 3, the process shown in FIG. 4 has two additions less on the critical path of an iteration.

Figure 5:
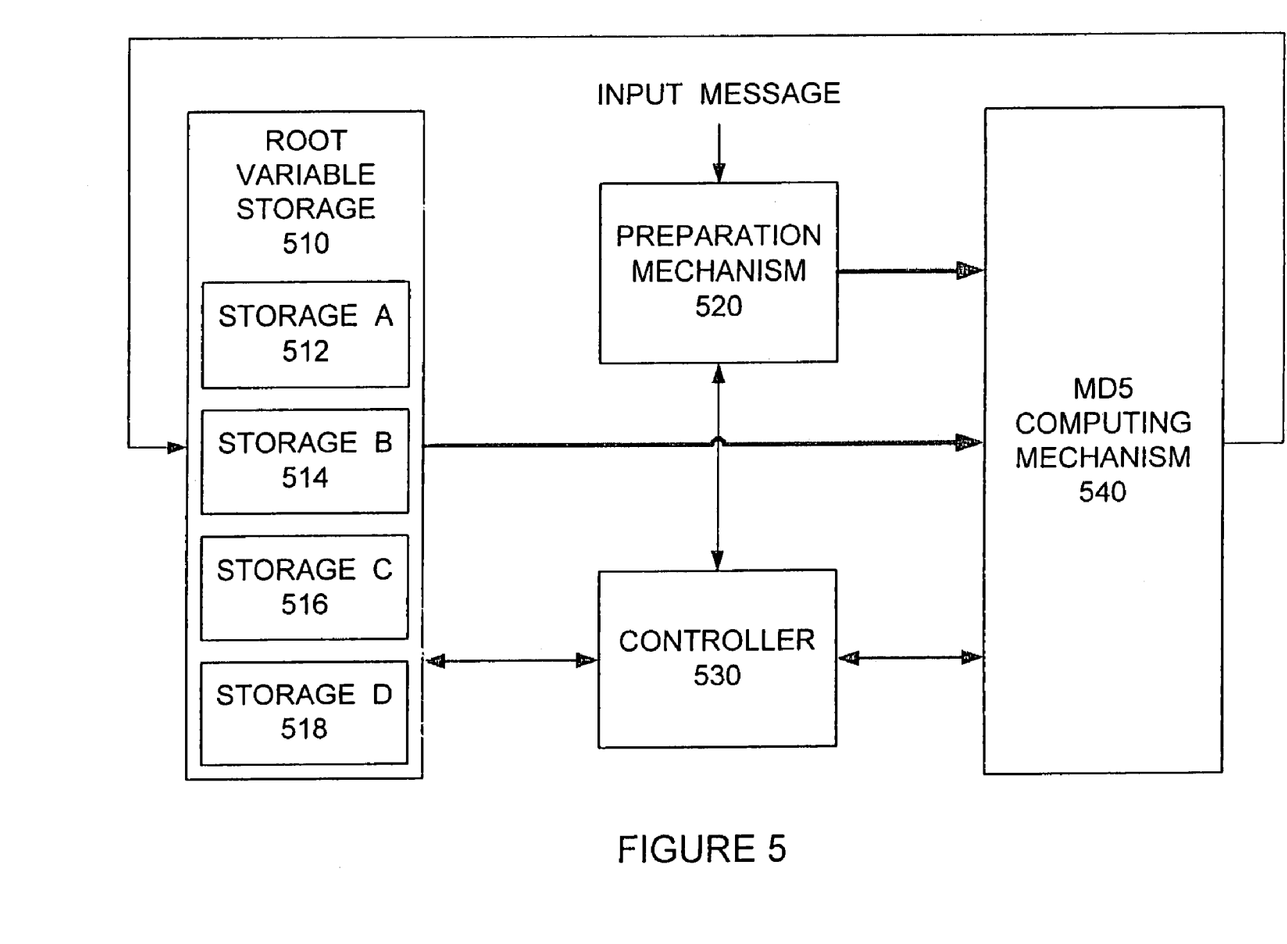
FIG. 5 is a block diagram of an example system that performs MD5 digesting.

FIG. 5 depicts an example system that performs MD5 digesting. The system comprises a root variable storage device 510, a preparation mechanism 520, a controller 530, and an MD5 computing mechanism 540. The root variable storage device 510 includes a storage A (512), a storage B (514), a storage C (516), and a storage D (518) to store root variables A, B, C, and D, respectively. The preparation mechanism 520 prepares an input message, via means such as padding and appending, so that the resulting message has a length that is a multiple of 512 bits. The preparation mechanism also generates a T-table with 64 values, each being used as T[m,n] (as shown in Equation 9) for the n-th iteration of the m-th round. Additionally, the preparation mechanism provides the MD5 computing mechanism values of S[m,n] as shown in Equation 9. Furthermore, the preparation mechanism supplies a word of the prepared input message, X[k] (as shown in Equation 9), required by each iteration of a round, according to the MD5 specification. In one embodiment, the preparation mechanism may be separated from other components as shown in FIG. 5. In another embodiment, the preparation mechanism may be entirely or partially combined with other components to achieve a desired result for the MD5 digesting process. The MD5 computing mechanism 540 performs operations involved in Equation 9 and generates a result for each iteration that is further used to update root variable A in the root variable storage device. The MD5 computing mechanism may comprise a circuitry such as a processor, an application specific integrated circuit (ASIC), a programmable logic, and a computer program. The controller 530 rotates root variables A, B, C, and D in the root variable storage device (e.g., "B→C→D→A") after operations in an iteration are performed and before the next iteration is started.

The controller also instructs the preparation mechanism what parameters (e.g., X[k], T[m,n], S[m,n]) should be made available for the MD5 computing mechanism and at what time. Additionally, the controller controls components in the MD5 computing mechanism so that they can work together to produce a result for each iteration. Furthermore, the controller may receive notifications from the root variable storage device, the preparation mechanism, and the MD5 computing mechanism when requested actions have been performed or requested data have been made available, so that the controller may issue next instructions needed to perform required operations. Under the control of the controller, the MD5 computing mechanism performs 4 rounds of operations, each round including 16 iterations of operations, for each 16-word blocks in the input message. When all 16-word block in the input message have been processed, resulting data stored in storages A, B, C, and D form a 128 bit digest of the input message.

Figure 6:
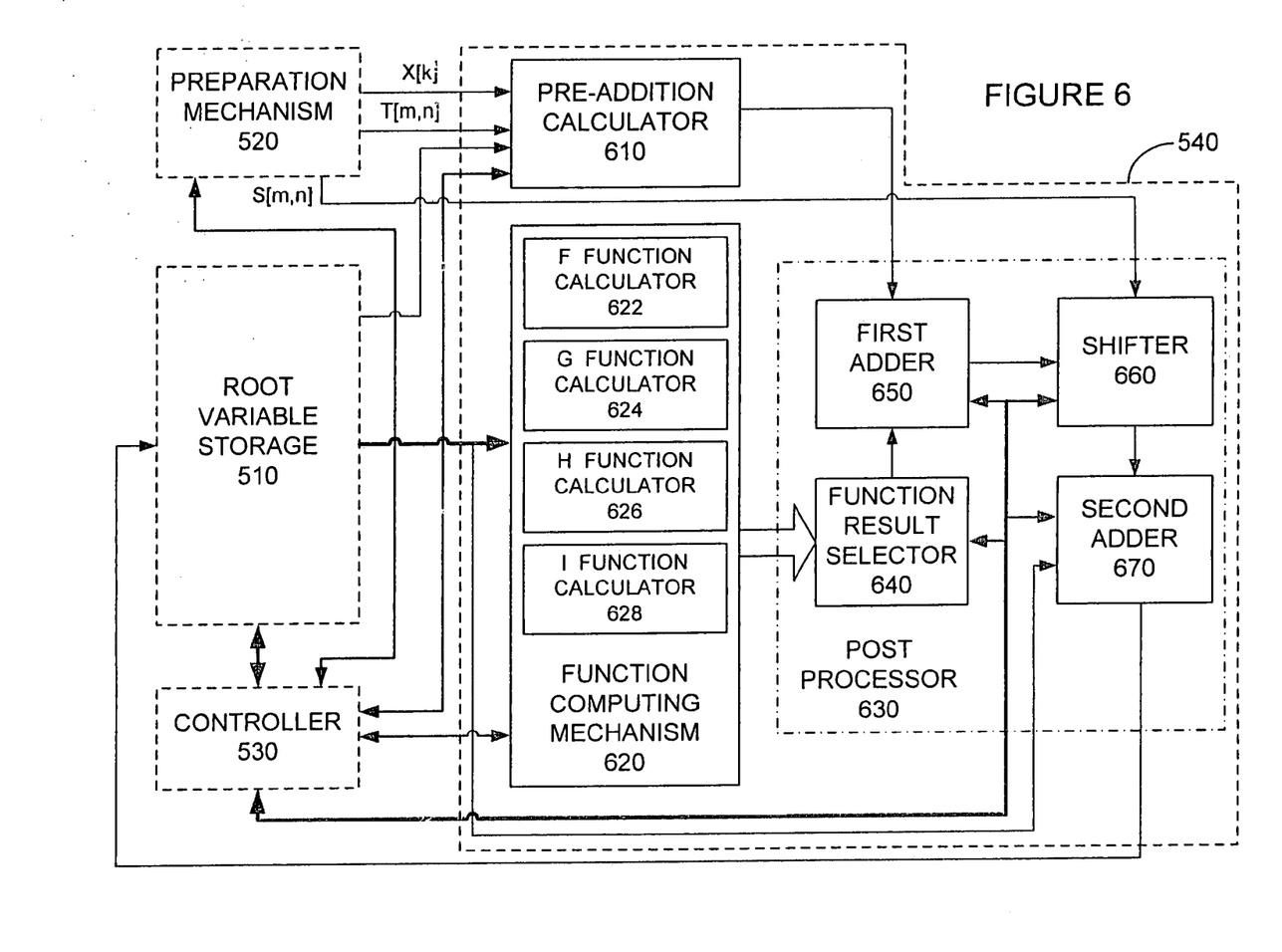
FIG. 6 is a diagram illustrating functional blocks that perform the MD5 digesting process, according to one embodiment of the present invention.

FIG. 6 depicts components in an MD5 computing mechanism 540 (shown in FIG. 5) that performs the MD5 digesting process, according to one embodiment of the present invention. The MD5 computing mechanism comprises a pre-addition calculator 610, a function computing mechanism 620, and a post processor 630. The pre-addition calculator 610 performs an addition among three parameters, X[k], T[m,n], and root variable A. X[k] and T[m,n] are a word in the prepared input message and a constant obtained from the T-table, respectively, required for the n-th iteration of the m-th round. X[k] and T[m,n] are provided by the preparation mechanism 520 under the direction of the controller 530. The pre-addition calculator may perform the addition in parallel while the function computing mechanism 620 is computing auxiliary functions, F, G, H, and I. The function computing mechanism 620 comprises an F function calculator 622, a G function calculator 624, an H function calculator 626, and an I function calculator 628. The F, G, H, and I function calculators performs operations involved in Equations 1, 2, 3, and 4, respectively, based on values of root variables B, C, and D. In one embodiment, all of the function calculators may be set to run for each iteration of each round, but only one result is selected for post processing by the post processor 630. In another embodiment, a function selector may be used to select a function calculator based on a round of computations, so that only one function is calculated for the round as required in the MD5 specification.

The post processor 630 comprises a function result selector 640, a first adder 650, a shifter 660, and a second adder 670. The function result selector 640 selects a result from F, G, H, and I function calculators in the function computing mechanism 620, depending on a round of computations (F function for round 1, G function for round 2, H function for round 3, and I function for round 4). In a hardware implementation, a function result selector may still be needed even if a function selector is used to select the required function calculator for a round. The first adder 650 adds the selected function result from the function result selector 640 with the output data from the pre-addition calculator 610. The output data from the first adder 650 is shifted to the left by S[m,n] bits by the shifter 660. S[m,n] is provided by the preparation mechanism 520 for the n-th iteration of the m-th round. The output data from the shifter 660 is further added with the value of root variable B, by the second adder 670, to produce a result of the current iteration. The iteration result is further used to update the value of root variable A. Because of circular rotation of root variables ("A→B→C→D→A"), the iteration result may be used to directly update the value of root variable B. The components in the MD5 computing mechanism as shown in FIG. 6 work together to produce an iteration result under the control of the controller 530. For example, the controller may instruct the function result selector 640 to select one result among four function results based on the round being currently computed.

As shown in FIG. 6, to produce a result from iteration n, calculation of an auxiliary function, two additions (performed by the first and the second adders), and one shift must be performed (because pre-addition for three parameters can be performed in parallel with the auxiliary function calculation, it does not need to be counted separately). It takes at least two clock cycles for these operations complete for many network processors. For one 16-word block of the input message, there are four rounds of computations, and each round includes 16 iterations. Thus, it takes at least 128 cycles to produce a 128 bit digest for a 16-word block. One approach to improving the speed of the MD5 digesting process is to pipeline computations of successive iterations. Because the result from iteration n (which is the value of root variable B for iteration n+1) is an input to the auxiliary function in iteration n+1, calculation of successive iterations cannot be readily pipelined. Therefore, an MD5 digesting system according to FIG. 6 has a throughput of one iteration every two cycles.

It is observed that any two consecutive iterations share two common inputs because of the way that the circular rotation of four root variables A, B, C, and D is performed from one iteration to the next, e.g., A→B→C→D→A. For example, assume that the order of inputs to the auxiliary function in iteration n is B-C-D (values from storages for root variable B, C, D), the order of inputs to the auxiliary function in iteration n+1 will be A-B-C (values from storages for root variables A, B, C). Iterations n and n+1 share two common inputs, values from storages for root variables B and C, in this example. Hence, the only input whose value is not available until the end of iteration n is A because its value will be updated at the end of iteration n. Because all of the four auxiliary functions involve bit-by-bit operations only, each of the 32 bits may be treated separately. Given the values of B and C, which are available from iteration n, for each bit position, the result of the auxiliary function at each of the 32 bits will be one of two values depending on the value of the corresponding bit in root variable A, which is updated at the end of iteration n. Thus, two values may be calculated for the auxiliary function for iteration n+1: one corresponding to such a value of A that each bit in A is set to 1, and the other corresponding to such a value of A that each bit in A is set to 0. This way, iteration n+1 may be started while iteration n is still being completed. For example, iteration n+1 may be started in the second cycle of iteration n. When the result of iteration n becomes available, it may be used to select, bit by bit, a correct output of the auxiliary function in iteration n+1. Assume that it takes two clock cycles to complete one iteration. If the second cycle starts at the selection of the output of the auxiliary function using the result from the preceding iteration, successive iterations may thus be pipelined. An MD5 digesting resulting from such a scheme may achieve a throughput of one iteration per clock cycle.

Figure 7:
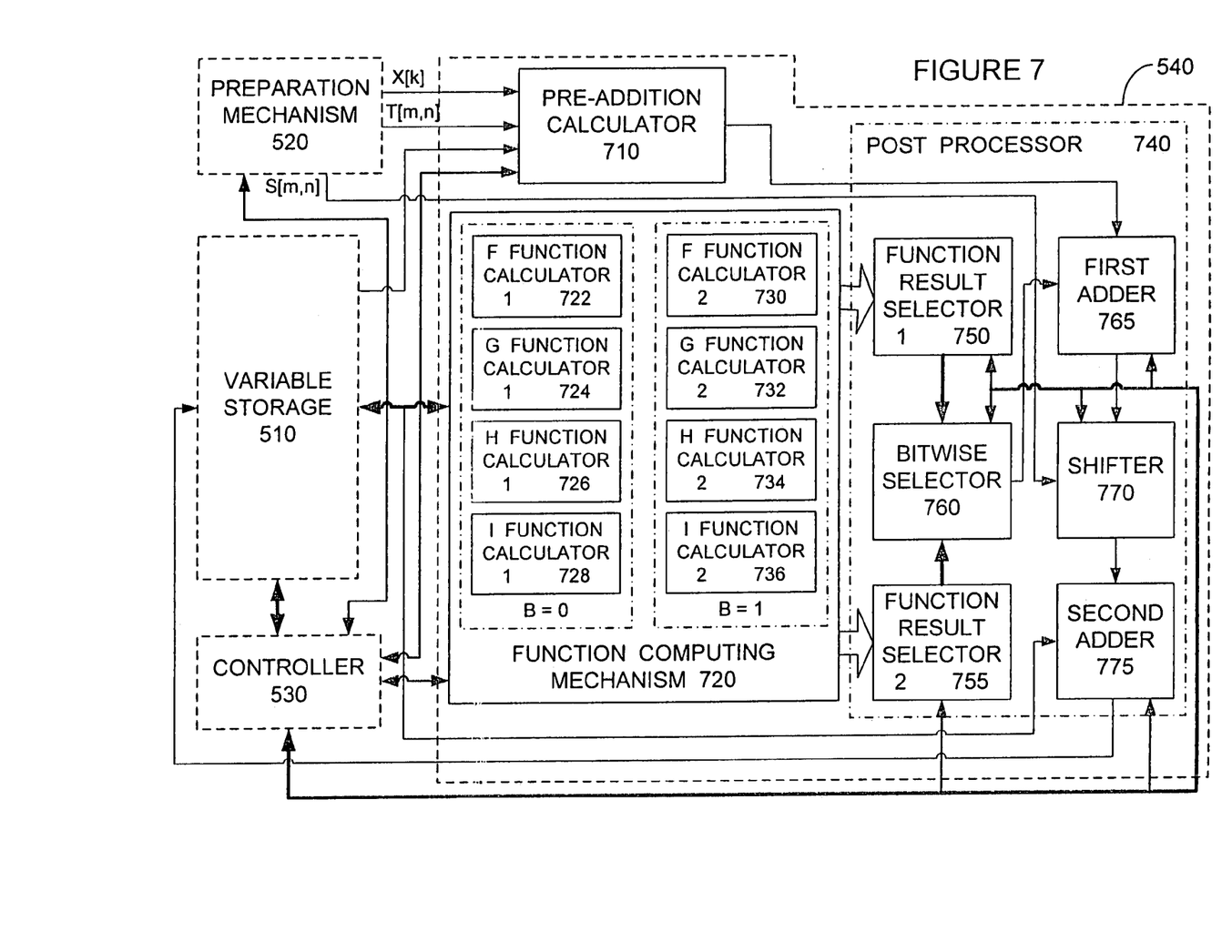
FIG. 7 is a diagram illustrating functional blocks that perform the MD5 digesting process by pipelining the digesting process, according to one embodiment of the present invention.

FIG. 7 depicts one embodiment of the MD5 computing mechanism 540, which can pipeline the MD5 digesting process. The MD5 computing mechanism comprises a pre-addition calculator 710, a function computing mechanism 720, and a post processor 740. The pre-addition calculator 710 performs an addition among three parameters, X[k], T[m,n], and root variable A. X[k] and T[m,n] are provided by the preparation mechanism 520 under the direction of the controller 530. The pre-addition calculator may perform the addition in parallel while the function computing mechanism 720 is computing auxiliary functions, F, G, H, and I. The function computing mechanism 720 comprises two sets of function calculators. The first set includes an F function calculator 1 (722), a G function calculator 1 (724), an H function calculator 1 (726), and an I function calculator 1 (728); and the second set includes an F function calculator 2 (730), a G function calculator 2 (732), an H function calculator 2 (734), and an I function calculator 2 (736). The F, G, H, and I function calculators performs operations involved in Equations 1, 2, 3, and 4, respectively, based on values of root variables B, C, and D. The first set of function calculators compute F, G, H, and I functions where all bits of root variable B are set to 0; and the second set function calculators compute these four functions where all bits of root variable B are set to 1. When values of B, C, and D are received, the two sets of function calculators may run in parallel. In one embodiment, all of the four function calculators in each set may be set to run for each iteration of each round, but only one result is selected from each set for post processing by the post processor 740. In another embodiment, a function selector may be used to select a function calculator for each set based on a round of computations, so that only one function is calculated in each set for the round as required in the MD5 specification.

The post processor 740 comprises two function result selectors (function result selector 1 (750) and function result selector 2 (755)), a bitwise selector 760, a first adder 765, a shifter 770, and a second adder 775. The function result selector 1 (750) selects a first result from the first set of function calculators, according to a round of computations (F function for round 1, G function for round 2, H function for round 3, and I function for round 4). The function result selector 2 (755) selects a second result, corresponding to the first result, from the second set of function calculators. In a hardware implementation, a function result selector may still be needed for each set of function calculators, even if a function selector is used to select the required function calculator in each set of function calculators for a round. The first result selected by the function result selector 1 corresponds to B's value of 0 (i.e., all bits of B are set to 0); and the second result selected by the function result selector 2 corresponds to B's value of ($2^{32}$−1) (i.e., all bits of B are set to 1). The bitwise selector 760 selects a correct function result between the first result and the second result, bit by bit, based on the result from the preceding iteration, under the direction of the controller 530. The first adder 765 adds the selected function result from the bitwise selector 760 with the output data from the pre-addition calculator 710. The output data from the first adder 765 is shifted to the left by S[m,n] bits by the shifter 770. S[m,n] is provided by the preparation mechanism 520 for the n-th iteration of the m-th round. The output data from the shifter 765 is further added with the value of root variable B, by the second adder 775, to produce a result of the current iteration. The iteration result is further used to update the value of root variable A. Because of circular rotation of root variables ("A→B→C→D→A"), the iteration result may be used to directly update the value of root variable B.

The components in the MD5 computing mechanism as shown in FIG. 7 work together to produce an iteration result under the control of the controller 530. For example, the controller may instruct the function result selector 1 (750) to select one result among the first set of four function calculators based on the round being currently computed. Additionally, the controller may decide how workload is allocated to different clock cycles. Assume that all operations needed to produce an iteration result can be completed in two cycles. If the controller starts the second cycle when the bitwise selector 760 starts to select a correct function result, which needs the result from the preceding iteration, operations involved in the first cycle will not depend on the result from the preceding iteration. Therefore, successive iterations may be pipelined.

Figure 8:
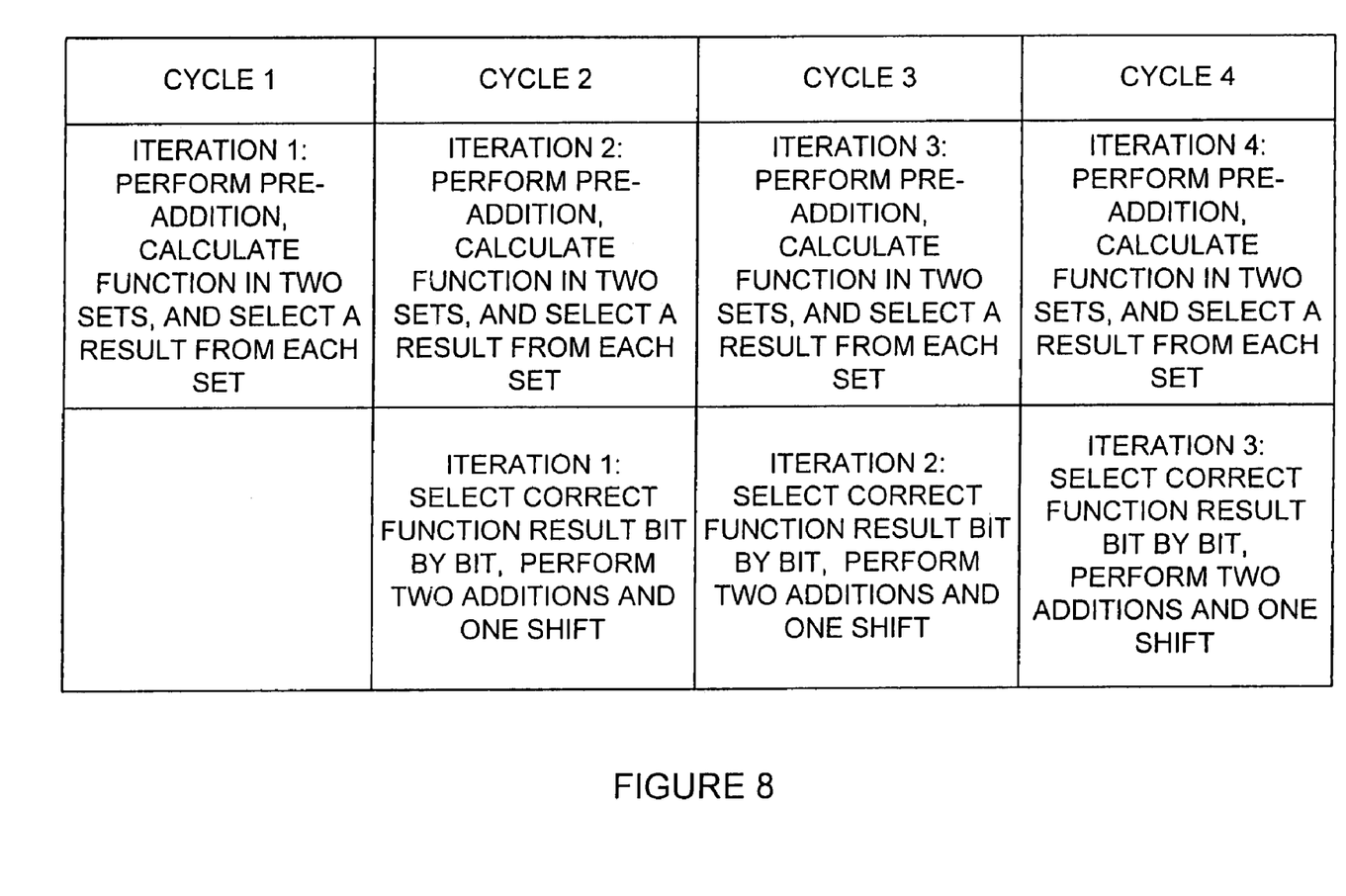
FIG. 8 is a table illustrating the process of pipelining the MD5 digesting process, according to one embodiment of the present invention.

FIG. 8 shows a table illustrating the process of pipelining the MD5 digesting process, according to one embodiment of the present invention. Assume that MD5 digesting starts in cycle 1. In cycle 1, pre-addition may be performed in parallel with auxiliary function calculation for iteration 1. Auxiliary functions in two sets (the first set corresponds to B's value of 0 and the second set corresponds to B's value of ($2^{32}-1$)) may be calculated in parallel. Also in cycle 1, a first result may be selected from the first set of functions and a second result may be selected from the second set of functions for iteration 1. In cycle 2, a correct function result may be selected between the first result and the second result, bit by bit, based on the initial value of root variable A for iteration 1. Also in cycle 2, two additions and one shift may be performed for iteration 1 (e.g., by the first adder, the second adder, and the shifter as shown in FIG. 7). Additionally, iteration 2 may start in cycle 2. Pre-addition, auxiliary function calculation in two sets, and function result selection from each of the two sets may be performed in cycle 2 for iteration 2. By the end of cycle 2, a result for iteration 1 is produced, which is used to update the value of root variable A which in turn becomes the value of B for iteration 2 because of circular rotation among A, B, C, and D. In cycle 3, a correct function result may be selected based on the result from iteration 1 (which is available now), and two additions and one shift may be performed for iteration 2. At the end of cycle 3, a result for iteration 2 is produced, which will eventually become the value of B for iteration 3. Also in cycle 3, iteration 3 may be started. Pre-addition, auxiliary function calculation in two sets, and function result selection from each of the two sets may be performed in cycle 3 for iteration 3. The process goes on until all 16-word blocks in the prepared input message have been processed. A final 128 bit digest for the input message is formed by concatenating bits in root variables A, B, C, and D. Using such a pipelining scheme, a system that implements MD5 digesting can achieve a throughput of one iteration per cycle.

Figure 9:
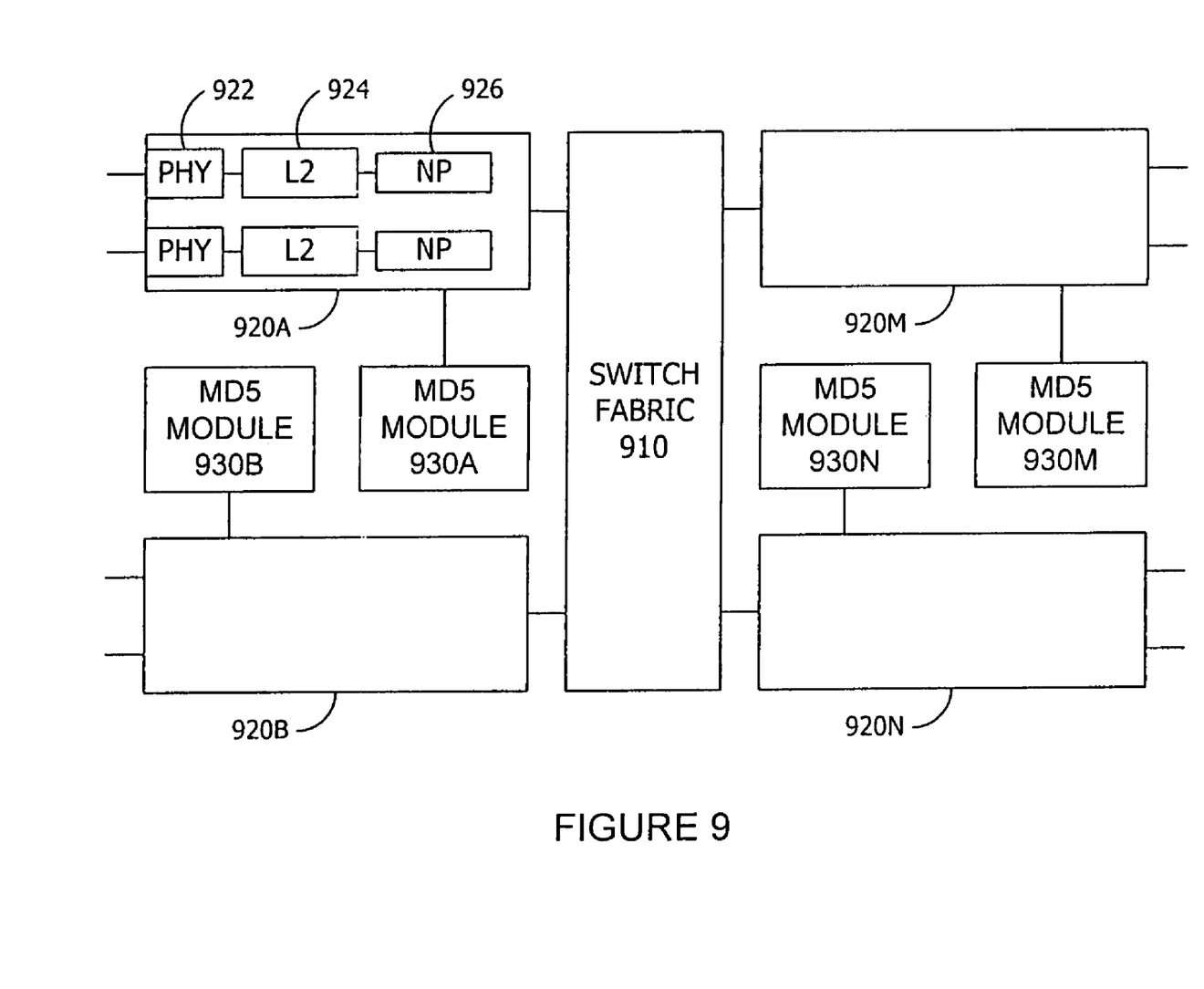
FIG. 9 is a diagram of a network system.

FIG. 9 depicts a network system that can perform MD5 digesting. The system may comprise a collection of line cards 920 ("blades") interconnected by a switch fabric 910 (e.g., a crossbar or shared memory switch fabric). Individual line cards may be located in the same physical location or different physical locations (e.g., different cities). The switch fabric, for example, may conform to Common Switch Interface (CSIX) or other fabric technologies such as HyperTransport, Infiniband, Peripheral Component Interconnect (PCI), Packet-Over-SONET (Synchronous Optic Network), RapidIO, and/or UTOPIA (Universal Test and Operations PHY (Physical Layer) Interface for ATM).

Individual line cards (e.g., 920A) may include one or more physical layer (PHY) devices 922 (e.g., optic, wire, and wireless PHYs) that handle communication over network connections. The PHYs translate between the physical signals carried by different network mediums and the bits (e.g., "0"-s and "1"-s) used by digital systems. The line cards 920 may also include framer devices (e.g., Ethernet, Synchronous Optic Network (SONET), High-Level Data Link (HDLC) framers or other "layer 2" devices) 924 that can perform operations on frames such as error detection and/or correction. The line cards 920 shown may also include one or more network processors 926 that perform packet processing operations for packets received via the PHY(s) 922 and direct the packets, via the switch fabric 910, to a line card providing an egress interface to forward the packet. Potentially, the network processor(s) 926 may perform "layer 2" duties instead of the framer devices 924.

The network processor(s) 926 may be an Intel® Internet eXchange network Processor (IXP) or other network processors featuring different designs. The network processor features a collection of packet processing engines on a single integrated circuit. Individual engines may provide multiple threads of execution. Additionally, the network processor includes a core processor (that is often programmed to perform "control plane" tasks involved in network operations. The core processor, however, may also handle "data plane" tasks. The network processor 926 also features at least one interface that can carry packets between the processor and other network components. For example, the processor can feature a switch fabric interface 910 that enables the processor 926 to transmit a packet to other processor(s) or circuitry connected to the fabric. The processor(s) 926 can also feature an interface that enables the processor to communicate with physical layer (PHY) and/or link layer devices (e.g., MAC or framer devices). The processor 926 also includes an interface (e.g., a Peripheral Component Interconnect (PCI) bus interface) for communicating, for example, with a host or other network processors. Moreover, the processor 926 also includes other components shared by the engines such as memory controllers a hash engine, and internal scratchpad memory.

As shown in FIG. 9, each line card 920 may be operably coupled with at least one MD5 module 930 (e.g., 930A) that performs MD5 ciphering. In one embodiment, the MD5 module may be separate from the line card. In another embodiment, the MD5 module may be integrated with the line card. Also in one embodiment, the MD5 module may be a part of the network processor 926 or a part of the PHY 922. Yet in another embodiment, the MD5 module may be located in other network layers such as a link layer, a network layer, and/or an application layer.

Although an example embodiment of the present disclosure is described with reference to diagrams in FIGS. 1-9, persons of ordinary skill in the art will readily appreciate that many other methods of implementing the present invention may alternatively be used. For example, the order of execution of the functional blocks or process procedures may be changed, and/or some of the functional blocks or process procedures described may be changed, eliminated, or combined.

In the preceding description, various aspects of the present disclosure have been described. For purposes of explanation, specific numbers, systems and configurations were set forth in order to provide a thorough understanding of the present disclosure. However, it is apparent to one skilled in the art having the benefit of this disclosure that the present disclosure may be practiced without the specific details. In other instances, well-known features, components, or modules were omitted, simplified, combined, or split in order not to obscure the present disclosure.

Embodiments of the present disclosure described herein may be implemented in circuitry, which includes hardwired circuitry, digital circuitry, analog circuitry, programmable circuitry, and so forth. They may also be implemented in computer programs. Such computer programs may be coded in a high level procedural or object oriented programming language. However, the program(s) can be implemented in assembly or machine language if desired. The language may be compiled or interpreted. Additionally, these techniques may be used in a wide variety of networking environments. Such computer programs may be stored on a storage media or device (e.g., hard disk drive, floppy disk drive, read only memory (ROM), CD-ROM device, flash memory device, digital versatile disk (DVD), or other storage device) readable by a general or special purpose programmable processing system, for configuring and operating the processing system when the storage media or device is read by the processing system to perform the procedures described herein. Embodiments of the disclosure may also be considered to be implemented as a machine-readable storage medium, configured for use with a processing system, where the storage medium so configured causes the processing system to operate in a specific and predefined manner to perform the functions described herein.

While this disclosure has been described with reference to illustrative embodiments, this description is not intended to be construed in a limiting sense. Various modifications of the illustrative embodiments, as well as other embodiments of the disclosure, which are apparent to persons skilled in the art to which the disclosure pertains are deemed to lie within the spirit and scope of the disclosure.

What is claimed is:

1. An apparatus for performing MD5 digesting, comprising:
    a variable storage device configured to store root variables;
    a function computing mechanism configured to compute auxiliary functions based on values of a portion of the root variables, a first value corresponding to a root variable not in the portion of the root variables and a second value corresponding to the root variable, wherein the actual value of the root variable is an iteration result of a preceding iteration;
    a pre-addition calculator to calculate a sum among three parameters, in parallel with the auxiliary function computation performed by the function computing mechanism; and
    a post processor to produce an iteration result for an MD5 digesting process based at least in part on output data from the function computing mechanism, the iteration result of the preceding iteration and output data from the pre-addition calculator.

2. The apparatus of claim 1, wherein the MD5 digesting process comprises four rounds of computations, each round including sixteen iterations of computations.

3. The apparatus of claim 1, wherein the function computing mechanism comprises four function calculators, each function calculator being used for a round of computations.

4. The apparatus of claim 1, wherein the iteration result is used to update one of the root variables in the variable storage device.

5. The apparatus of claim 1, further comprising a controller to control the variable storage device, the function computing mechanism, the pre-addition calculator, and the post processor to produce the iteration result and to perform iterations of computations required by the MD5 digesting process for generating a digest for an input message.

6. The apparatus of claim 1, wherein the variable storage device rotates values of the root variables after one iteration of computations is completed and before the next iteration of computations starts, under the control of the controller.

7. The apparatus of claim 1, wherein the post processor comprises:
    a function result selector to select a result among results generated by four function calculators in the function computing mechanism, corresponding to a round of computations;
    a first adder to add output data from the pre-addition calculator and the selected result from the function computing mechanism;
    a shifter to shift output data from the first adder by a predetermined number of bits; and
    a second adder to add output data from the shifter and one of the root variables to produce the iteration result.

8. The apparatus of claim 1, wherein the three parameters comprise one of the root variables, one pre-determined parameter, and a parameter derived from an input message.

9. An apparatus for performing message digesting, comprising:
    a variable storage device configured to store root variables;
    a function computing mechanism configured to compute a first set of functions based on a first value corresponding to a root variable and a second set of functions based on a second value corresponding to the root variable, wherein the actual value of the root variable is an iteration result of a preceding iteration, both the first set of functions and the second set of functions based on values of a portion of the root variables wherein the portion of the root variables does not include the root variable;
    a pre-addition calculator to calculate a sum among a set of parameters, in parallel with the auxiliary function computation performed by the function computing mechanism; and
    a post processor to produce an iteration result for a message digesting process based at least in part on output data from the function computing mechanism, the iteration result of the preceding iteration and output data from the pre-addition calculator.

10. The apparatus of claim 9, wherein the message digesting process comprises M rounds of computations, each round including N iterations of computations, wherein M and N are positive integers.

11. The apparatus of claim 9, wherein each of the first set and the second set of functions comprises K function calculators, a function calculator in the first set and a corresponding function calculator in the second set being used for a round of computations, wherein K is a positive integer.

12. The apparatus of claim 9, wherein the iteration result is used to update one of the root variables in the variable storage device.

13. The apparatus of claim 9, further comprising a controller to control the variable storage device, the function computing mechanism, the pre-addition calculator, and the post processor to produce the iteration result and to perform iterations of computations required by the message digesting process for generating a digest for an input message.

14. The apparatus of claim 9, wherein the variable storage device rotates values of the root variables after one iteration of computations is completed and before the next iteration of computations starts, under the control of the controller.

15. The apparatus of claim 13, wherein the controller controls the pre-addition calculator, the function computing mechanism, and the post processor to pipeline operations involved in successive iterations.

16. The apparatus of claim 9, wherein the post processor comprises:
    a first function result selector to select a first result among results generated by the first set of functions in the function computing mechanism, corresponding to a round of computations;
    a second function result selector to select a second result among results generated by the first set of functions in the function computing mechanism, corresponding to the round of computations;

a bitwise selector to select a set of bits between the first result and the second result, based on the iteration result of the preceding iteration, wherein the set of bits forms a final function result;

a first adder to add output data from the pre-addition calculator and the final function result;

a shifter to shift output data from the first adder by a predetermined number of bits; and a second adder to add output data from the shifter and one of the root variables from the variable storage device to produce a result for a current iteration of computations.

17. The apparatus of claim 9, wherein the set of parameters comprises one of the root variables, one pre-determined parameter, and a parameter derived from an input message.

18. A method for performing MD5 digesting, comprising:
receiving a first message at an apparatus for performing MD5 digesting;
preparing the first message using a preparation mechanism to generate a second message and a plurality of parameters, wherein the second message has a length of a multiple of 16-word blocks;
initializing root variables stored in a variable storage device;
performing four rounds of computations for each 16-word block in the second message, based at least in part on the plurality of parameters and the initialized root variables, to produce a digest for the first message, wherein each round comprises a plurality of iterations including iteration n and iteration n+1, each iteration comprising a computation, and iteration n+1 being based on a result of iteration n, and the computation of iteration n is performed by a pre-addition calculator in parallel with the computation of iteration n+1, wherein the computation of iteration n is computed by computing an actual value of a root variable, and the computation of iteration n+1 comprises a function computing mechanism configured to compute an auxiliary function based on a first value of the root variable and computing the auxiliary function based on a second value of the root variable, the actual value of the root variable being the result of iteration n; and
circularly rotating root variables using a controller after each iteration of computations is completed and before a succeeding iteration starts.

19. The method of claim 18, wherein each of the four rounds of computations comprises 16 iterations of computations.

20. The method of claim 18, wherein the four rounds of computation comprise computation of four functions, each function corresponding to a round, and the same function used for 16 iterations of the same round.

21. The method of claim 18, wherein the digest comprises final values of the root variables.

22. The method of claim 19, wherein iterations of computations in the four rounds comprise a two-stage pipeline, each iteration of computations including a first stage and a second stage.

23. The method of claim 22, wherein each of the first stage and the second stage is performed within one clock cycle, the second stage of an iteration and the first stage of a succeeding iteration are performed within one clock cycle.

24. A method for pipelining message digesting, comprising:
receiving a first message at an apparatus for performing message digesting;
preparing the first message using a preparation mechanism to generate a second message and a plurality of parameters, wherein the second message has a length of a multiple of N-word blocks, wherein N is a positive integer;
initializing root variables stored in a variable storage device; and
performing M rounds of computations for each N-word block in the second message, based at least in part on the plurality of parameters and the initialized root variables, to produce a digest for the first message, wherein M is a positive integer and a round of computations comprises a multiple of iterations of computations including iteration n and iteration nil, and iteration n+1 being based on a result of iteration n, iterations of computations being computed using a two-stage pipeline, wherein a second stage of iteration n is performed by a pre-addition calculator in parallel with a first stage of iteration n+1, wherein the second stage of iteration n comprises computing an actual value of a root variable, and the first stage of iteration nil comprises a function computing mechanism configured to compute an auxiliary function based on a first value of the root variable and computing the auxiliary function based on a second value of the root variable, the actual value of the root variable being the result of iteration n, and a result from an iteration being used to update one of the root variables; and
rotating root variables using a controller after an iteration of computations is completed and before a succeeding iteration starts.

25. The method of claim 24, wherein the digest comprises final values of the root variables.

26. The method of claim 24, wherein each stage is computed within one clock cycle.

27. The method of claim 24, wherein the first stage comprises:
performing a pre-addition among one of the root variables, one pre-determined parameter, and a parameter derived from the second stage;
computing a first set of K functions and a second set of K functions, wherein K is a positive integer and each function is required for a round of computations; and
selecting a first result from results obtained from the first set and selecting a second result from results obtained from the second set.

28. The method of claim 24, wherein the second stage comprises:
selecting, bit by bit between a first function result and a second function result, based on a final result from a preceding iteration, wherein the first function result is the auxiliary function based on the first value of the root variable, the second function result is the auxiliary function based on the second value of the root variable and the final result is the actual value of the root variable;
adding the final function result and output data from a pre-addition performed in the first stage to produce a first intermediate result for a current iteration;
shifting the first intermediate result by a pre-determined number of bits to obtain a second intermediate result for the current iteration; and
adding the second intermediate result and one of the root variables to produce a final result for the current iteration.

29. A network system, comprising:
a switch fabric;
a plurality of line cards interconnected by the switch fabric; and
a plurality of MD5 modules, each operably coupled with a line card to perform MD5 digesting, an MD5 module including:
  a variable storage device configured to store root variables;
  a function computing mechanism configured to compute auxiliary functions based on values of a portion of the root variables, a first value corresponding to a root variable not in the portion of the root variables and a second value corresponding to the root variable wherein the actual value of the root variable is an iteration result of a preceding iteration;
  a pre-addition calculator to calculate a sum among three parameters, in parallel with auxiliary function computation performed by the function computing mechanism; and
  a post processor to produce an iteration result for an MD5 digesting process based at least in part on output data from the function computing mechanism, the iteration result of the preceding iteration and output data from the pre-addition calculator.

30. The network system of claim 29, wherein the MD5 digesting process comprises four rounds of computations, each round including sixteen iterations of computations.

31. The network system of claim 29, wherein the function computing mechanism comprises four function calculators, each function calculator being used for a round of computations.

32. The network system of claim 29, wherein the iteration result is used to update one of the root variables in the variable storage device.

33. The network system of claim 29, further comprising a controller to control the variable storage device, the function computing mechanism, the pre-addition calculator, and the post processor to produce the iteration result and to perform iterations of computations required by the MD5 digesting process for generating a digest for an input message.

34. The network system of claim 29, wherein the variable storage device rotates values of the root variables after one iteration of computations is completed and before the next iteration of computations starts, under the control of the controller.

35. The network system of claim 29, wherein the post processor comprises:
  a function result selector to select a result among results generated by four function calculators in the function computing mechanism, corresponding to a round of computations;
  a first adder to add output data from the pre-addition calculator and the selected result from the function computing mechanism;
  a shifter to shift output data from the first adder by a predetermined number of bits; and
  a second adder to add output data from the shifter and one of the root variables to produce the iteration result.

36. The network system of claim 29, wherein the three parameters comprise one of the root variables, one pre-determined parameter, and a parameter derived from an input message.

37. A network system, comprising:
a switch fabric;
a plurality of line cards interconnected by the switch fabric; and
a plurality of message digesting modules, each operably coupled with a line card to perform message digesting, an message digesting module including:
  a variable storage device configured to store root variables;
  a function computing mechanism configured to compute a first set of functions based on a first value corresponding to root variable and a second set of functions based on a second value corresponding to the root variable, wherein the actual value of the root variable is an iteration result of a preceding iteration, both the first set of functions and the second set of functions based on values of a portion of the root variables wherein the portion of the root variables does not include the root variable;
  a pre-addition calculator to calculate a sum among a set of parameters, in parallel with auxiliary function computation performed by the function computing mechanism; and
  a post processor to produce an iteration result for a message digesting process based at least in part on output data from the function computing mechanism, the iteration result of the preceding iteration and output data from the pre-addition calculator.

38. The network system of claim 37, wherein the message digesting process comprises M rounds of computations, each round including N iterations of computations, wherein M and N are positive integers.

39. The network system of claim 37, wherein each of the first set and the second set of functions comprises K function calculators, a function calculator in the first set and a corresponding function calculator in the second set being used for a round of computations, wherein K is a positive integer.

40. The network system of claim 37, wherein the iteration result is used to update one of the root variables in the variable storage device.

41. The network system of claim 37, further comprising a controller to control the variable storage device, the function computing mechanism, the pre-addition calculator, and the post processor to produce the iteration result and to perform iterations of computations required by the message digesting process for generating a digest for an input message.

42. The network system of claim 37, wherein the variable storage device rotates values of the root variables after one iteration of computations is completed and before the next iteration of computations starts, under the control of the controller.

43. The network system of claim 41, wherein the controller controls the pre-additioncalculator, the function computing mechanism, and the post processor to pipeline operations involved in successive iterations.

44. The network system of claim 37, wherein the post processor comprises:
  a first function result selector to select a first result among results generated by the first set of functions in the function computing mechanism, corresponding to a round of computations;
  a second function result selector to select a second result among results generated by the first set of functions in the function computing mechanism, corresponding to the round of computations;
  a bitwise selector to select a set of bits between the first result and the second result, based on the iteration result of the preceding iteration, wherein the set of bits forms a final function result;

a first adder to add output data from the pre-addition calculator and the final function result;
a shifter to shift output data from the first adder by a predetermined number of bits; and
a second adder to add output data from the shifter and one of the root variables from the variable storage device to produce a result for a current iteration of computations.

45. The network system of claim 37, wherein the set of parameters comprises one of the root variables, one predetermined parameter, and a parameter derived from an input message.

* * * * *